United States Patent
Abramovitch et al.

(10) Patent No.: US 6,961,317 B2
(45) Date of Patent: Nov. 1, 2005

(54) IDENTIFYING AND SYNCHRONIZING PERMUTED CHANNELS IN A PARALLEL CHANNEL BIT ERROR RATE TESTER

(75) Inventors: Daniel Y. Abramovitch, Palo Alto, CA (US); Michael J. Weinstein, Los Altos, CA (US); Heinz R. Plitschka, Harrenbaerg (DE)

(73) Assignee: Agilent Technologies, Inc., Palo Alto, CA (US)

( * ) Notice: Subject to any disclaimer, the term of this patent is extended or adjusted under 35 U.S.C. 154(b) by 958 days.

(21) Appl. No.: 09/967,780

(22) Filed: Sep. 28, 2001

(65) Prior Publication Data

US 2003/0063566 A1  Apr. 3, 2003

(51) Int. Cl.[7] ............................................... H04J 1/20
(52) U.S. Cl. ...................................................... 370/252
(58) Field of Search ................................ 370/241–247, 370/250–253; 375/106, 111, 114, 116, 365; 714/738

(56) References Cited

U.S. PATENT DOCUMENTS

| | | | |
|---|---|---|---|
| 5,086,438 A | * | 2/1992 | Sugata et al. ............... 375/365 |
| 5,761,216 A | | 6/1998 | Sotome et al. |
| 5,991,270 A | * | 11/1999 | Zwan et al. ................. 370/249 |
| 6,498,833 B2 | * | 12/2002 | Sugino et al. ............. 379/1.01 |

FOREIGN PATENT DOCUMENTS

JP  2001 127729  5/2001

OTHER PUBLICATIONS

Signalwiggard: all-channel testing technology (SONET), Agilent, Online, May 1, 2001.

* cited by examiner

*Primary Examiner*—Chi Pham
*Assistant Examiner*—Thai Hoang (57) ABSTRACT

A test system that includes a generator and an analyzer acting cooperatively to test a device having a plurality of device communication channels. The device has a plurality of inputs and corresponding outputs, each input being connected to a corresponding one of the outputs. The correspondence between the input and output channels may change if the device is turned off and on or if the device is not actively sending data from the inputs to the outputs. The test system determines a mapping between the device inputs and outputs prior to performing bit error rate testing utilizing a mapping test pattern. The test system can then switch to a bit error rate test pattern without causing the device to drift such that the correspondence between the input and output channels is lost.

23 Claims, 4 Drawing Sheets

IDENTIFYING AND SYNCHRONIZING PERMUTED CHANNELS IN A PARALLEL CHANNEL BIT ERROR RATE TESTER

FIELD OF THE INVENTION

The present invention relates to the testing of high-speed communication channels, and more particularly, to an improved parallel channel bit error rate tester and method for using the same to test such channels.

BACKGROUND OF THE INVENTION

A parallel channel bit error rate tester is normally used in communication systems having a number of separate channels. Such testers provide a means for testing many channels simultaneously, and hence, reduce the time needed to test a communication system. In addition, such testers can detect errors that are only present when a number of channels are operating simultaneously. For example, errors resulting from cross-talk between two channels only appear when there is data on both channels. A parallel channel bit error rate tester typically includes a pattern generator for generating signals on each of the channels to be tested and an analyzer that examines the signals received at the terminus of the communication channels to determine if the received signals match the generated signals from the pattern generator.

A parallel channel bit error rate tester may also be used to test a communications channel having a data rate that is higher than that of the individual channels of the tester. To do this, individual test signals from the pattern generator channels are multiplexed together to form a high-speed signal which is sent on the high-speed channel. At the terminus of the communication channel, the high speed data stream is demultiplexed and fed to the error analyzer channels of the parallel channel bit error rate tester.

The multiplexer and demultiplexer circuits may be considered part of the instrument or part of the device under test (DUT), depending upon the application. For example, communication systems in which a number of relatively low speed signals are multiplexed to form a single high-speed signal that is sent on a high-speed link and then demultiplexed are well known in the communication arts. In such systems, the parallel channel bit error rate tester need not include the multiplexers and demultiplexers, as these are part of the communications system that is being tested. On the other hand, if the communications system being tested has only one input and output channel, the multiplexers and demultiplexers must be provided as part of the testing system to test the high-speed link.

The conversion of parallel streams into a serial stream and then back into parallel streams via multiplexers and demultiplexers can lead to a rearrangement of the data patterns such that the pattern input on the $i^{th}$ channel of the transmitting device is not received on the $i^{th}$ channel of the receiver. This can occur if the phases of the various multiplexers and demultiplexers are not properly synchronized. This lack of synchronization can result from the multiplexers not being synchronized with each other, the demultiplexers not being synchronized with each other, or the demultiplexers as a group not being synchronized with the multiplexers as a group. An unknown time delay through the communication link often results in a lack of synchronization between the multiplexers and the demultiplexers. Each of these conditions can result in a rearrangement of the data patterns.

These data rearrangements pose a problem because bit error-rate testing is based on knowledge of the data pattern expected in each channel by the error analyzer. If the expected data pattern is rearranged, then the test is useless unless this rearrangement can be identified. Once identified, the appropriate compensation can be instituted.

In principle, the rearrangements can be removed by synchronizing the multiplexer circuits with each other, and/ or synchronizing the demultiplexer circuits with each other, and then synchronizing the multiplexer circuits to the demultiplexer circuits. At that point, the data streams entering the analyzer can be synchronized with each other in time. While communications multiplexers that are synchronized to each other (and also have synchronized phases) can be constructed, it is far less practical to construct communications demultiplexers that can be synchronized to each other and share a common internal phase. This is largely due to two phenomena. First, demultiplexers often recover the data clock from the data passing therethrough. The clock recovery circuits in these demultiplexers have divide by n circuits, where n is the fan out of the demultiplexer. These circuits typically initialize in a random state relative to the multiplexers, and hence, will not, in general, be properly synchronized. Secondly, the unavoidable time delay of propagating the data stream through the communication link connecting the multiplexers and demultiplexers results in the data arriving with an unknown phase relative to that of the multiplexers.

Broadly, it is the object of the present invention to provide an improved parallel channel bit error rate tester and method of using the same to test communications networks, and the like.

These and other objects of the present invention will become apparent to those skilled in the art from the following detailed description of the invention and the accompanying drawings.

SUMMARY OF THE INVENTION

The present invention is a test system that includes a generator and an analyzer acting cooperatively to test a device having a plurality of device communication channels. The device has a plurality of inputs and corresponding outputs, each input routing data to a corresponding one of the outputs. The generator includes a plurality of test pattern channels. Each test pattern channel includes a pattern generator reference memory for storing a test sequence to be communicated to an input of the device and a circuit for repetitively sending the test sequence to one of the channels of the device. The analyzer includes a plurality of analyzer channels. Each analyzer channel includes an input for receiving a channel input signal, an analyzer pattern reference memory for storing a reference pattern utilized by that analyzer channel, and a compare circuit for comparing that reference pattern with a signal received on one of the communication channels of the device. The compare circuit provides a bit error value indicative of the extent of mismatch between the reference pattern and the received signal. The test system includes a program for operating the analyzer and generator that provides a mapping of the input channels of the device to the output channels of the device. The program (a) causes one of the generator and the analyzer to load the reference memories included therein with a set of mutually exclusive mapping test patterns such that each reference memory has a unique test pattern stored therein; (b) causes the other of the generator and the analyzer to load one of the set of mapping test patterns into all of the memories; (c) causes each analyzer channel to compare the channel input signal received on that channel with the reference pattern stored in that channel; and (d) determines if one of the bit error values provided by the compare circuits is less than a bit error threshold value, and if so, maps the analyzer channel for which the bit error value is less than the bit error threshold value to the generator channel having the same mapping test pattern. The test system repeats (a)–(d) with a different one of the mapping test patterns being loaded into the memories in (b) until the controller is able to assign all of the input channels to their corresponding output channels. The test system can also utilize information about the device being tested in conjunction with one or more channel mappings to map the remainder of the channels once one or more corresponding channels have been mapped using the algorithm discussed above. In the preferred embodiment of the present invention, the reference memories of the generator rather than the analyzer are loaded with the set of mutually exclusive mapping test patterns during the input to output channel mapping operation. After the test system has mapped the input and output channels of the device, the generator loads a set of bit error test patterns into the reference memories in the controller and to proceed with bit error testing.

DETAILED DESCRIPTION OF THE INVENTION

Figure 1:
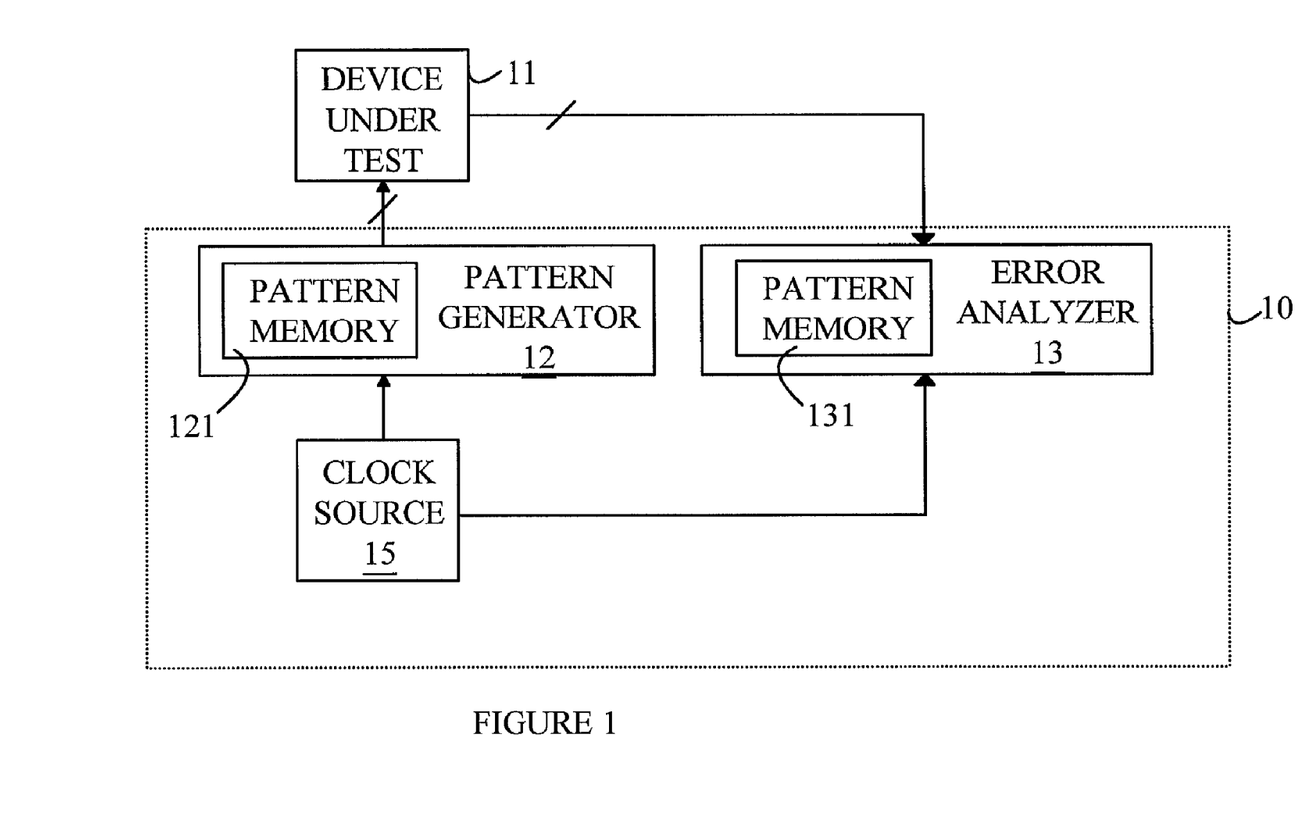
FIG. 1 is a schematic drawing of parallel channel bit error rate tester 10 connected to a device under test.
Figure 2:
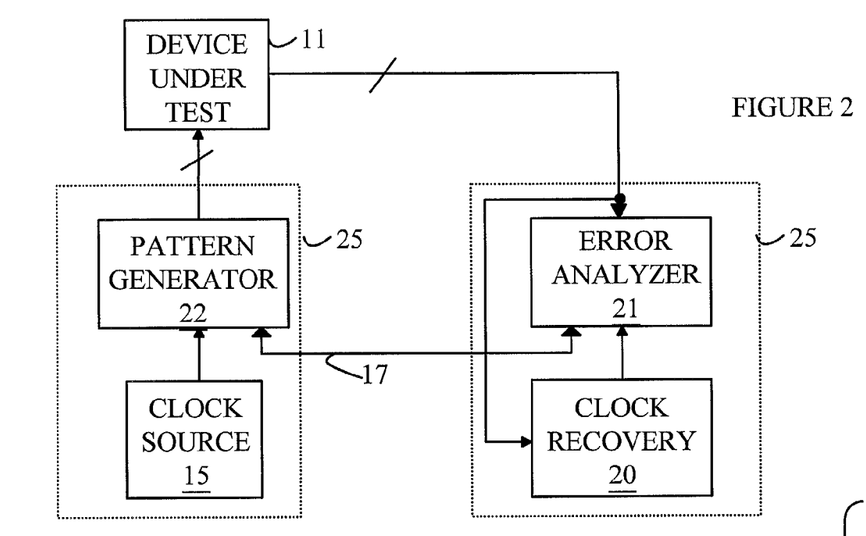
FIG. 2 is a schematic drawing of a parallel channel bit error rate tester 25 in which the analyzer is far from the pattern generator.

The manner in which the present invention provides its advantages can be more easily understood with reference to FIG. 1, which is a schematic drawing of parallel channel bit error rate tester 10 connected to a device under test (DUT) 11. In its simplest form, parallel channel bit error rate tester 10 consists of a pattern generator 12 and an error analyzer 13 that are connected through DUT 11. The pattern generator generates a predetermined pattern for input to DUT 11. This pattern is stored in a pattern memory 121. Analyzer 13 compares the received data to the known pattern, which is stored in pattern memory 131 and measures the bit error (BER). The pattern generator has a clock source 15, which triggers the generation of the test data. To conduct bit error rate testing, error analyzer 13 must be clocked at the same rate as the incoming data stream. This is accomplished either by triggering the error analyzer and pattern generator from a common clock source, or by having the error analyzer work from a clock that has been recovered from the data. In the embodiment shown in FIG. 1, the analyzer is assumed to be close enough to the pattern generator to share the same clock. The choice depends upon the application and the proximity of the error analyzer to the pattern generator. If the analyzer section is far from the pattern generator, a clock recovery circuit 20 is included in the analyzer as shown in FIG. 2; however, embodiments in which a clock recovery circuit is included in error analyzer 13 may also be practiced. FIG. 2 is a schematic drawing of a parallel channel bit error rate tester 25 in which the analyzer 21 is far from the pattern generator 22. To simplify the drawing, the pattern memories have been omitted from the drawing. Clock generation circuit 20 is conventional, and hence will not be discussed in detail here. In general, the analyzer and pattern generator have a communication path 17 for communicating instructions between one another.

The pattern sent into the DUT must be a known pattern. The most common types of patterns are Pseudo Random Bit Sequences (PRBS), Pseudo Random Word Sequences (PRWS), and memory-based patterns. Memory based patterns are those that are loaded into memory before the test to be read out sequentially during the test. PRBSs are sequences generated from a combination of shift registers and logic. The data of such sequences appears to be random but is actually deterministic. There are families of known, standard PRBSs that are used for testing various types of channels. The main advantage of PRBSs is that while these sequences are deterministic, they have largely the same statistical and spectral properties of random data. PRWS are parallel versions of PRBSs in which the sequence is spread across multiple parallel channels so that the bits of the PRBS come out in cyclical sequence across all the channels. Memory-based patterns can take any form including that of a PRBS/PRWS. The only limits to a memory-based pattern are the size of the memory and the speed at which it can be accessed. Memory based patterns can be used to simulate a variety of communication protocols by constructing a pattern that consists of repetitive patterns such as those used for headers with PRBS/PRWS patterns in the place in the packets to simulate data. In many cases, it is easier to synchronize the channels using PRBS/PRWS patterns than memory based patterns, since once the specific PRBS/PRWS algorithm is known, one needs only a small set of bits to uniquely determine the test sequence.

Figure 3:
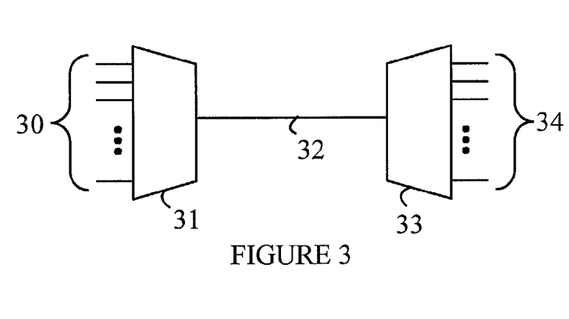
FIGS. 3 and 4 are schematic drawings of the types of multiplexing schemes that are typically utilized in telecommunications systems.
Figure 4:
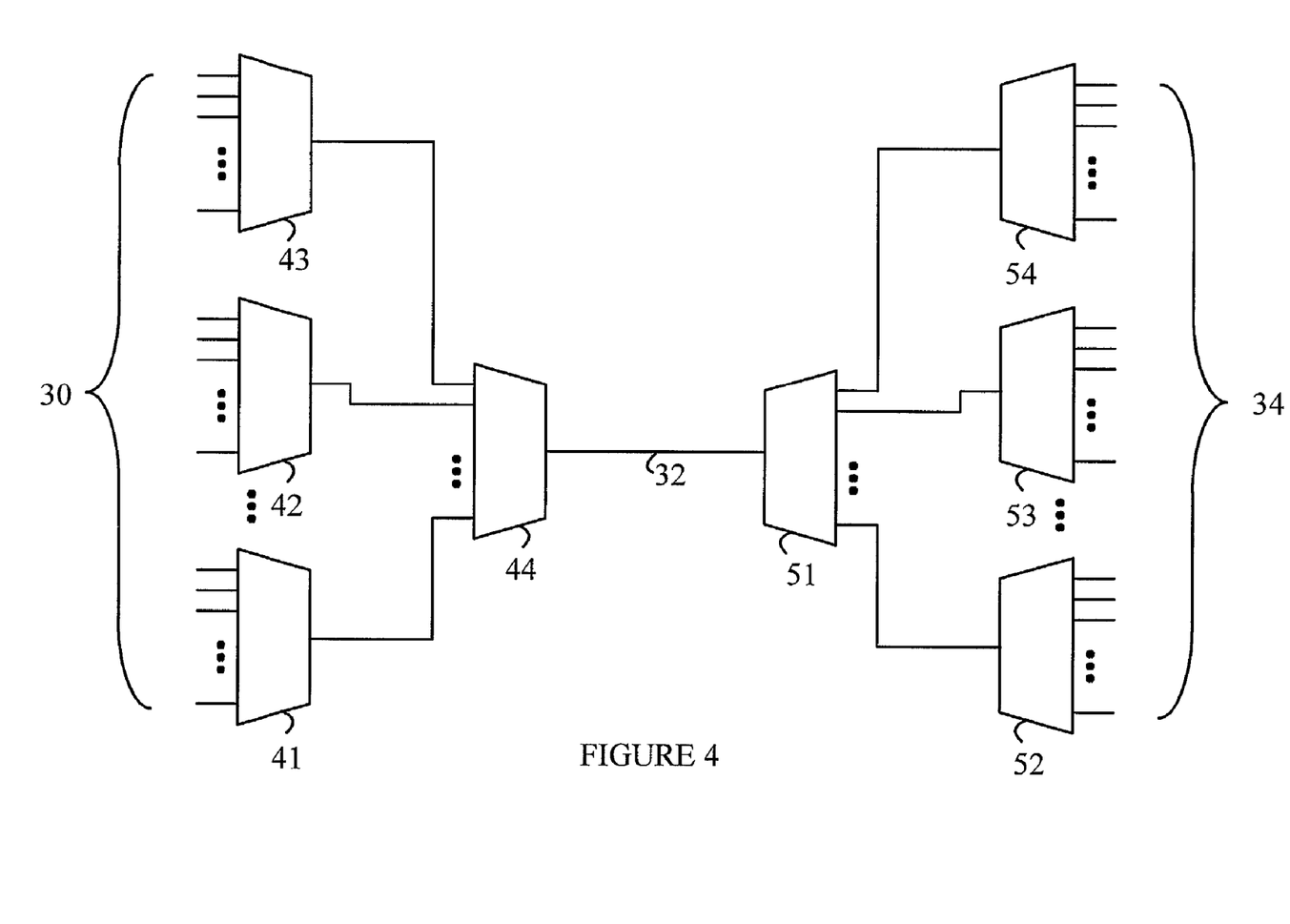

In principle, parallel channel bit error rate testers are well suited for testing telecommunication and network systems. These systems often have multiple data streams that are multiplexed into one or more higher speed streams before being sent across a high-speed channel. The received high-speed streams at the far end of the channel are then demultiplexed into their constituent or tributary streams. Refer now to FIGS. 3 and 4, which are schematic drawings of the types of multiplexing schemes that are typically utilized in telecommunication systems. The multiplexing may be done at a single level as shown in FIG. 3 or at multiple levels as shown in FIG. 4. Referring to FIG. 3, the tributary data streams 30 are input to a multiplexer 31, which combines the data streams by selecting one bit from each data stream in sequence and outputting the combined high-speed data stream on a communication link 32. At the terminal end of the communication link, a demultiplexer 33 receives the high-speed data stream and routes bits to successive ones of the output data streams shown at 34.

The multiplexers and demultiplexers can be viewed as containing a pointer that indicates the next channel to be serviced. In the case of the multiplexer, the pointer indicates the next data input to be used as the source of a bit that is to be placed on communication link 32. In the case of the demultiplexer, the pointer indicates the identity of the next data output line that is to receive a bit from communication link 32. Each pointer is incremented modulo N after M data bits have been transferred in a 1:N multiplexer or demultiplexer. In the simplest case, M=1. If the pointers are not properly synchronized, the data streams leaving the demultiplexer channels will be permuted relative to the data streams that entered the multiplexer. The problem can be corrected by resetting the pointer in the multiplexer or demultiplexer to synchronize the multiplexer and demultiplexer. Note that if M>1, then one of the counters must also be reset to synchronize the multiplexer and demultiplexer.

Referring to FIG. 4, the multiplexer and demultiplexer can be constructed from cascaded stages of smaller multiplexers and demultiplexers, respectively. In the example shown in FIG. 4, multiplexer 31 shown in FIG. 3 has been replaced by two stages of smaller multiplexers shown at 41–44. Similarly, demultiplexer 33 has been replaced by two stages of smaller demultiplexers as shown at 51–54. In the staged multiplexers and demultiplexers, the component multiplexers and demultiplexers must also be synchronized with one another.

The present invention is based on an algorithm that identifies the channel permutations that occur when parallel data passes through communication multiplexers and demultiplexers. By identifying and compensating for these channel permutations, the present invention avoids the problem of re-synchronizing the various multiplexers and demultiplexers. The manner in which the algorithm operates can be more easily understood with reference to FIG. 5, which is a flow chart of one embodiment of an algorithm according to the present invention for identifying the channel permutations resulting from the lack of synchrony discussed above. Denote the number of channels to be tested by N, which is assumed to be greater than 1. The algorithm starts by loading N unique bit patterns into the N different generator channels as shown at 61. In the following discussion, the patterns will be numbered by the generator associated with that pattern, i.e., pattern k is the pattern generated by generator k.

Figure 5:
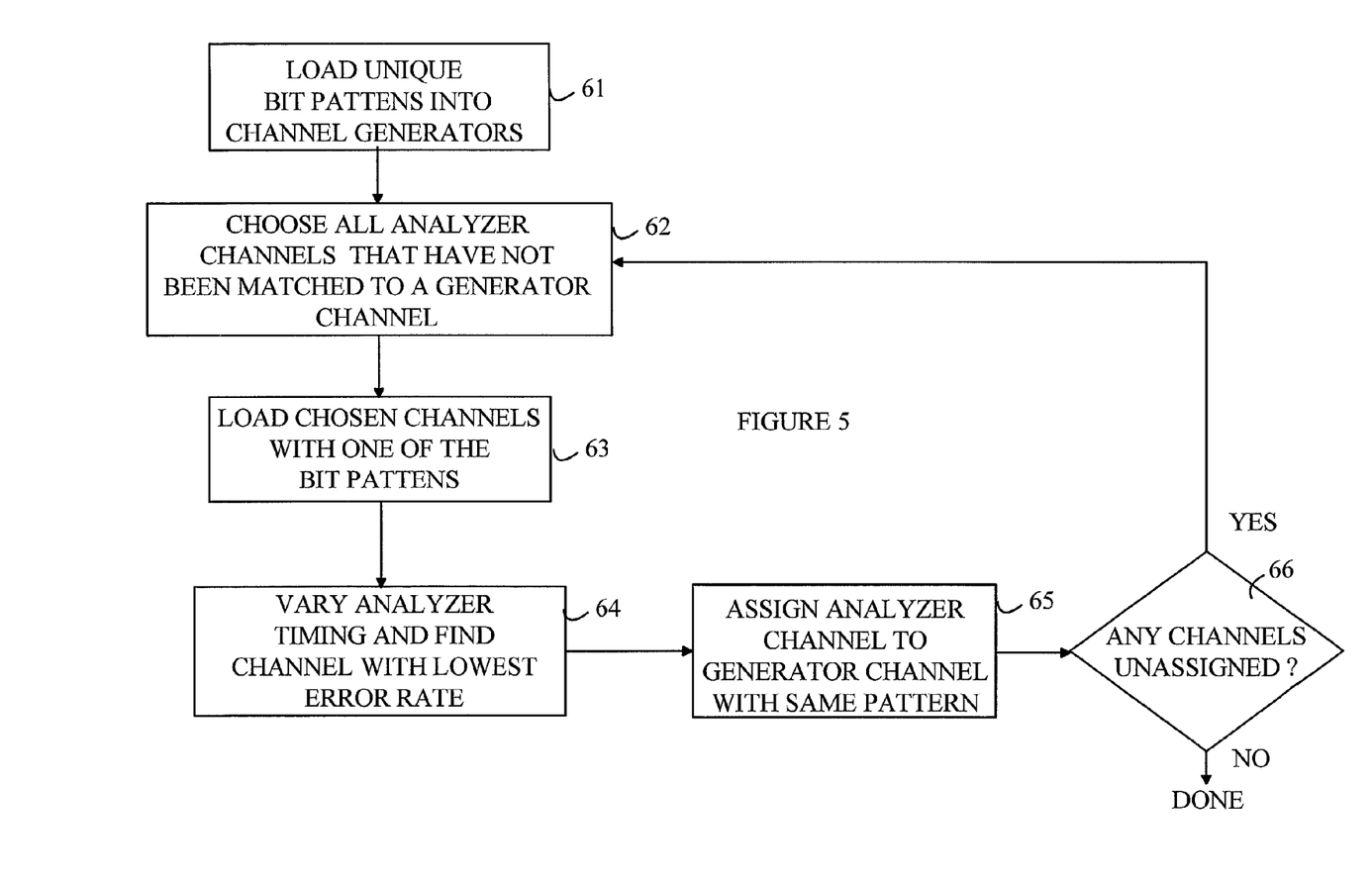
FIG. 5 is a flow chart of one embodiment of an algorithm according to the present invention for identifying the channel permutations resulting from a lack of synchrony.

Next, the tester chooses one of the patterns and loads this pattern into all of the N analyzer channels as shown at 62 and 63. The tester then attempts to synchronize all of the analyzer channels with the generator channels as shown at 64. This requires that the generators continuously output data streams while the timing of the analyzers is adjusted to minimize the bit error rate. Note that this adjustment can be either manual or automatic, done entirely in hardware or done in conjunction with software. In this step, the same delay is preferably added to each of the channels and the bit error rate of each channel measured. This process is repeated until a channel is found in which the bit error rate remains below a certain threshold, σ, for a specific value of the delay. This channel is then considered to be synchronized.

Of the N different patterns being received by the N individual analyzer channels, only one will match the pattern loaded into all the analyzers. Thus, the analyzer that is receiving that matching bit pattern, call it analyzer j, is the only one that can be synchronized. The bit error rates on the other channels will remain high due to the mismatched patterns. The input to analyzer j is then known to come from generator k and a single input output pair is identified as shown at 65.

Next, the tester determines if any analyzer channel has not been assigned to a generator channel as shown at 66. If such a channel exits, the algorithm loops back to 62 with that channel as the analyzer channel. This step is repeated until each of the N analyzer channels has been assigned to a corresponding generator channel.

The analyzer channels may be synchronized using a wide variety of synchronization test patterns including special synchronization patterns. In general these patterns will differ from patterns that are going to be used during the actual testing. However, the actual test pattern data can be utilized if they meet the unique pattern criteria discussed above. If the data being sent is the data that is desired for test, then a time synchronization that aligns the analyzer channels with one another can be performed to get all the identified channels synchronized in time, and the test phase can then begin.

In general, the analyzer and generator will have microcontrollers that execute the algorithms described herein. In the following discussion, the part of the testing program that runs on the analyzer controller will be referred to as the "analyzer control program", and the part of the program that runs on the generator controller as the "generator control program". The test sequences that are used to link the input channels from the generators to the input channels on the analyzers will be referred to as the "synchronization test patterns". The patterns used to perform the actual bit error rate measurements will be referred to as the bit error rate patterns.

If the bit error rate patterns are different from the synchronization test patterns, the test patterns must be switched in both the generator and analyzer prior to beginning the actual bit error rate testing. The switch is preferably accomplished by having the analyzer control program send a signal/message signifying that the identification portion of the synchronization is complete to the generator control program. Upon receipt of this message, the generator control program triggers an event that loads the bit error rate patterns. Upon doing this, it sends a command to the analyzer control program instructing the analyzer to prepare for testing. When the analyzer control program receives this command, it reloads its data segments to match the corresponding bit error rate patterns that will be sent by the generators. The analyzer then does a time synchronization to align the channels in time. In order to do this, the test data must include a unique bit sequence that defines a known point in the test data on each channel. Once aligned, the system is ready to do bit error rate testing.

It should be noted that in embodiments in which the analyzer obtains its clock signal from the data stream or the demultiplexers generate their clocks from the data stream, the clocks on the analyzer side will drift once the generator stops sending data. If this drift is not significant or the analyzer obtains its clock independent of the data, then a dual version of this algorithm can be used in which the analyzers are loaded with the N different patterns and the generators keep being reloaded with different patterns one at time until the analyzers detect that all channels are synchronized and can be utilized.

From the above discussion, it will be clear that there are three distinct steps in the bit error rate testing for communication systems and the like: the identification, or mapping, step, the synchronization step, and the testing step. The synchronization includes linking each generator channel to its corresponding analyzer channel to correct for any channel rearrangements. This step can be accomplished by changing the physical wiring between the system under test and either the analyzer or generator sections of the tester. The linking operation can also be accomplished by changing the "logical wiring" within the analyzer or generator sections. For example, the data read from the demultiplexer outputs into the analyzer section is typically stored in the memory associated with a digital processor in the analyzer. Data for specific channels is stored at locations defined by one or more memory pointers. Hence, channels can be interchanged by altering these pointer values. As used herein, the term "rewiring" refers both to physical rewiring and logical rewiring. There are two general preferred embodiments of a tester according to the present invention.

In the first embodiment, the permutations found during the identification step are used to specify a rewiring between the demultiplexer outputs and the analyzer inputs. In the second embodiment, the test patterns in the analyzer are permuted to compensate for the measured permutation in the channels. In principle, embodiments based on a combination of these strategies can also be constructed. For example, one could perform the identification of the channel permutations by rewiring the connections between the demultiplexer outputs and the analyzer inputs. Then for the actual test, undo the rewiring and permute the test patterns in the analyzer memory.

In principle, embodiments in which the rewiring is done on the generator side can also be practiced. However, if these actions require interruption of the generation of data, then the multiplexer/demultiplexer circuitry may not have a known phase when the data generation recommences, and hence, the identification obtained in the identification step would no longer be valid. Since the state of the analyzer has no effect on the multiplexer or demultiplexer phases, a scheme which interrupts the analysis of data rather then the generation of data is preferred.

If the bit error test patterns are different from the synchronization test patterns, the analyzer must communicate the need to switch data sets to the generator. The change in test patterns must occur in a manner that does not interfere with the synchronization or the systems must be resynchronized using the bit error test patterns, or parts thereof. Once the channels have been synchronized using the synchronization test patterns, the analyzer sends a message to the generator indicating that it is ready to begin bit error testing. The generator then switches test sequences and enters a loop in which it repetitively sends each bit error test pattern. The analyzer must then determine when to start making bit error measurements. This is equivalent to determining when the start of the first bit error test pattern occurs at the analyzer side of the network being tested.

If the analyzer is close to the generator, and the delays in the communication between the control programs of each can be ignored, the analyzer and generator need only have some agreed upon signal that the switch has occurred. For example, the generator can send an acknowledgement signal that is timed relative to the start of the bit error patterns in a manner that is known to the analyzer. If the delays through the network being tested are significantly less than the time needed to send one sequence, a signal that is sent in the middle of the current test sequence and that indicates that the test data starts after the completion of the current sequences can be utilized. Since the analyzer knows the length of the synchronization test patterns, the analyzer can switch patterns at the appropriate point.

If the analyzer is far from the generator, the time needed for the analyzer to signal the generator and receive an acknowledgement can be much larger than the time needed to send one of the bit error rate test patterns. In this case, the analyzer must detect the point in the data stream entering its inputs that corresponds to the beginning of the bit error test patterns. In one preferred embodiment of the present invention, the synchronization test patterns are constrained to be the same length as the bit error test patterns. In such an embodiment, the analyzer can restrict its search for the beginning of the bit error test patterns to those points in time corresponding to the beginning of the sequences of this length. It should be noted that this approach would also improve the search time if the bit error test patterns have a length that is an integer of multiple synchronization test patterns.

An alternate embodiment involves avoiding the switch between synchronization data and test data. To do this, the unique synchronization bits must be embedded in the test data. This can be accomplished utilizing some of the features of existing parallel channel bit error rate tester systems. Such systems utilize memory arrangements in which the sequences used for synchronizing the timing in the channels consist of sequences stored at a specified location in the memory. The synchronization sequence is typically a small fraction of the actual test sequences. For example, the first 48 bits are reserved in the Agilent 81250 tester for time synchronization test patterns. In this tester, the bit error test patterns are typically of the order of 3000 bits or larger. For example, a common desirable test frame for telecommunications equipment vendors is a SONET frame. A SONET frame for the emerging OC-768 standard would involve more than 4 million bits. Furthermore, a test sequence may include multiple copies of such frames. The analyzer uses the 48 bits to synchronize the analyzer and generator channels assuming that the corresponding channels are connected. Hence, a parallel channel bit error rate tester according to the present invention can be implemented on such a tester by inserting a control code that performs the channel identification and rewiring prior to switching to the synchronization and test phases that are normally implemented on this tester.

The fixed, small number of synchronization bits poses two problems for implementing the present invention on such systems. First, the remainder of the test pattern must be filled with a pattern that maintains the synchrony of the clocks in the demultiplexers and analyzer. To do this, the pattern must not contain long runs of 1's or 0's. The maximum length of such a run depends on the specific device or network being tested. To avoid such issues, the data block should have a roughly balanced number of ones and zeros and run lengths of either ones or zeros should be limited. This can be accomplished through requirements on the user data or by using some form of run length limited coding (RLL) or scrambling of the data. It should be noted that scrambling of the data by means of XORing it with a PRBS sequence almost always results in limited runs of 1s and 0s, with the exception of the pathological case where the data and the scrambling bits are identical. In this case, the scrambled sequence degenerates to all 0s.

The second problem relates to testing in which the test phase uses data that simulates specific telecommunications formats such as SONET or SDH. These formats typically have header information in each packet that is specified by the specific format, and hence, is not available for test data. These formats provide specific locations in the data packets for the data being transmitted. When testing a communications system designed to carry such packets, the test sequences typically include these headers with the test data in the positions provided for data transmission. While the headers are not actually needed during the bit error tests, the headers are included so that the test data has the same frequency spectrum as real data being sent in such packets. In many cases, the header data overlaps the region of the test data memory that is reserved for the time synchronization test patterns. Since the header data is fixed and must include format specific information, it cannot be conveniently used as the synchronization test pattern. In the preferred embodiment of the present invention, this problem is circumvented in such testers by circularly shifting the data packets such that the header information is now located in the portion of the memory that is not used for synchronization. The part of the packet having the unique sequences can then be positioned in the part of the memory reserved for synchronization. Since any circular shift of the packet preserves the frequency spectrum of the packet, the shifted packet allows the synchronization scheme of the present invention to be run on such existing test equipment while simulating the communication format in question.

A third embodiment utilizes separate synchronization and test blocks. The synchronization blocks are constructed as before. However, the test blocks also contain synchronization bits that are used in the test block once the channel connections have been identified, to get timing synchronization. Since the channels are already identified, the synchronization bits need not be unique to a given channel. This relaxes the requirement that an identification block needs to be the same size as a test block and can reduce the size of the test block used to ascertain the channel IDs. This reduces the time taken for channel ID. The timing synchronization must still be performed on the test data blocks.

The above-described embodiments of the present invention utilize a channel matching algorithm that determines the correspondence between each generator output channel and an analyzer input channel without reference to any matches found in previous searches. If the structure of the multiplexers and demultiplexers is known, the previously determined matches may be utilized to reduce the work of finding the remaining matches. Consider the simple case in which the network being tested contains a single stage multiplexer and a single stage demultiplexer. Also assume that the pointers in the multiplexers and demultiplexers are incremented modulo M after each bit is sent or received, respectively. Here, M is the number of input or output channels. Once the relationship between the pointer values in the multiplexer and demultiplexer is known, the mapping of the input to output ports can be computed without further searching. In this case, the relationship can be determined from the first pair of input and output ports that are mapped at the analyzer, independent of M. Hence, the M-1 step search can be reduced to finding the first matched pair of channels and computing the remaining cases.

In more complex networks, additional pairs of input-output pairs must be determined before the remainder can be computed from the knowledge of the network. However, the total number of pairs that must be determined by searching can still be substantially reduced if the structure of the multiplexers and demultiplexers is known.

Various modifications to the present invention will become apparent to those skilled in the art from the foregoing description and accompanying drawings. Accordingly, the present invention is to be limited solely by the scope of the following claims.

What is claimed is:

1. A test system comprising a generator, and an analyzer acting cooperatively to test a device having a plurality of device communication channels, said device connecting an input of each of said communication channels to an output of one of said communication channels, said generator comprising a plurality of generator channels, each test pattern channel comprising a generator pattern reference memory for storing a test sequence to be communicated to an input of said device, and a circuit for repetitively sending said test sequence to one of said channels of said device, said analyzer comprising a plurality of analyzer channels, each analyzer channel comprising an input for receiving a channel input signal, an analyzer pattern reference memory for storing a reference pattern utilized by that analyzer channel, and a compare circuit for comparing that reference pattern with a signal received on one of said communication channels of said device, said compare circuit providing a bit error value indicative of the extent of mismatch between said reference pattern and said received signal, and said analyzer and generator further comprising a program for operating said analyzer and generator, said program:

(a) causing one of said generator and said analyzer to load said reference memories included therein with a set of mutually exclusive mapping test patterns such that each reference memory has a unique test pattern stored therein;

(b) causing the other of said generator and said analyzer to load one of said set of mapping test patterns into all of said memories;

(c) causing each analyzer channel to compare said channel input signal received on that channel with said reference pattern stored in that channel;

(d) determining if one of said bit error values provided by said compare circuits is less than a bit error threshold value, and if so, mapping said analyzer channel for which said bit error value is less than said bit error threshold value to said generator channel having the same mapping test pattern.

2. The test system of claim 1 wherein said program repeats (a)–(d) with a different one of said mapping test patterns being loaded into said memories in (b).

3. The test system of claim 1 wherein said reference memories of said generator are said reference memories that are loaded with said set of mutually exclusive mapping test patterns.

4. The test system of claim 1 wherein said compare circuits compare said reference pattern with said received signal shifted in time.

5. The test system of claim 1 wherein each mapping test pattern comprises a first sequence that is unique to said mapping test pattern and a second sequence that is shared by all of said mapping test patterns, said second sequence being chosen such that said device being tested remains synchronized with said test system.

6. The test system of claim 5 wherein said second sequence comprises alternating 1's and 0's.

7. The test system of claim 1 wherein said analyzer further comprises a clock generation circuit for generating a clock signal from said received signal, said clock signal being utilized by said compare circuits.

8. The test system of claim 7 wherein said analyzer or said generator includes information defining at least one structural element of the device being tested and wherein said program maps one generator channel to one analyzer channel utilizing that information and the information on one previously mapped generator channel and analyzer channel pair.

9. The test system of claim 1 wherein said program causes said generator to load a set of bit error test patterns into said reference memories in said generator after said program has mapped each generator channel to a corresponding analyzer channel.

10. The test system of claim 9 wherein said bit error test patterns have the same length as said mapping test patterns.

11. The test system of claim 10 wherein said analyzer loads said bit error test patterns into said reference memories in said analyzer channels in response to a signal indicating that said generator has loaded said bit error test patterns.

12. The test system of claim 9 wherein said program causes said analyzers to measure bit error values when said generators send said bit error test patterns, said analyzer utilizing said mapping to determine a correspondence between said analyzer channels and said generator channels.

13. The test system of claim 9 wherein said bit error test patterns conform to a SONET frame.

14. The test system of claim 9 wherein said bit error test patterns conform to a SDH frame.

15. A method for operating a test system comprising a generator and an analyzer acting cooperatively to test a device having a plurality of device communication channels, said device connecting an input of each of said communication channels to an output of one of said communication channels, said generator comprising a plurality of generator channels, each test pattern channel comprising a generator pattern reference memory for storing a test sequence to be communicated to an input of said device, and a circuit for repetitively sending said test sequence to one of said channels of said device, and said analyzer comprising a plurality of analyzer channels, each analyzer channel comprising an input for receiving a channel input signal, an analyzer pattern reference memory for storing a reference pattern utilized by that analyzer channel, and a compare circuit for comparing that reference pattern with a signal received on one of said communication channels of said device, said compare circuit providing a bit error value indicative of the extent of mismatch between said reference pattern and said received signal, said method comprising (a) causing one of said generator and said analyzer to load said reference memories included therein with a set of mutually exclusive mapping test patterns such that each reference memory has a unique test pattern stored therein;

(b) causing the other of said generator and said analyzer to load one of said set of mapping test patterns into all of said memories;

(c) causing each analyzer channel to compare said channel input signal received on that channel with said reference pattern stored in that channel;

(d) determining if one of said bit error values provided by said compare circuits is less than a bit error threshold value, and if so, mapping said analyzer channel for which said bit error value is less than said bit error threshold value to said generator channel having the same mapping test pattern.

16. The method of claim 15 further comprising the step of repeating (a)–(d) with a different one of said mapping test patterns being loaded into said memories in (b).

17. The method of claim 15 wherein said compare circuits compare said reference pattern with said received signal shifted in time.

18. The method of claim 15 wherein each mapping test pattern comprises a first sequence that is unique to said mapping test pattern and a second sequence that is shared by all of said mapping test patterns, said second sequence being chosen such that said device being tested remains synchronized with said test system.

19. The method of claim 15 wherein said test system includes information defining at least one structural element of the device being tested and wherein said test system maps one generator channel to one analyzer channel utilizing that information and the information on one previously mapped generator channel and analyzer channel pair.

20. The method of claim 15 further comprising the step of causing said generator to load a set of bit error test patterns into said reference memories in said generator after said method has mapped each generator channel to a corresponding analyzer channel.

21. The method of claim 20 wherein said bit error test patterns have the same length as said mapping test patterns.

22. The method of claim 20 wherein said bit error patterns correspond to a SONET frame.

23. The method of claim 20 wherein said bit error patterns correspond to a SDH frame.

* * * * *